(12) United States Patent
Oakley et al.

(10) Patent No.: US 11,644,227 B2
(45) Date of Patent: May 9, 2023

(54) START-STOP CONTROL SYSTEMS AND METHODS FOR GAS FOIL BEARING MACHINE

(71) Applicant: Emerson Climate Technologies, Inc., Sidney, OH (US)

(72) Inventors: Michael D. Oakley, Dayton, OH (US); Zheji Liu, Tipp City, OH (US); Michael M. Perevozchikov, Tipp City, OH (US); Matthew J. Swallow, Versailles, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 165 days.

(21) Appl. No.: 17/009,535

(22) Filed: Sep. 1, 2020

(65) Prior Publication Data

US 2022/0065513 A1 Mar. 3, 2022

(51) Int. Cl.
*F25B 49/02* (2006.01)
*F25B 41/20* (2021.01)
*F25B 31/02* (2006.01)

(52) U.S. Cl.
CPC .......... *F25B 49/025* (2013.01); *F25B 31/026* (2013.01); *F25B 41/20* (2021.01); *F25B 2400/07* (2013.01); *F25B 2600/026* (2013.01); *F25B 2600/0251* (2013.01); *F25B 2600/0253* (2013.01); *F25B 2600/2501* (2013.01); *F25B 2700/151* (2013.01); *F25B 2700/171* (2013.01); *F25B 2700/19* (2013.01)

(58) Field of Classification Search
CPC ...... F25B 31/026; F25B 41/20; F25B 49/025; F25B 2600/0251; F25B 2600/0253; F25B 2600/026; F25B 2600/0261; F25B 2600/0262; F25B 2600/2501; F25B 2700/151; F25B 2700/171; F25B 2700/19
See application file for complete search history.

(56) References Cited

U.S. PATENT DOCUMENTS

| 3,811,805 | A | * | 5/1974 | Moody, Jr. | .......... F04C 29/0021 418/99 |
| 5,306,116 | A | | 4/1994 | Gunn et al. | |
| 5,702,110 | A | * | 12/1997 | Sedy | .................... F16J 15/3412 277/400 |
| 6,489,692 | B1 | | 12/2002 | Gilbreth et al. | |

(Continued)

FOREIGN PATENT DOCUMENTS

KR 20120095629 A 8/2012

OTHER PUBLICATIONS

International Search Report and Written Opinion for PCT/US2021/047453 dated Nov. 18, 2021, 11 pgs.

*Primary Examiner* — Jonathan Bradford
(74) *Attorney, Agent, or Firm* — Armstrong Teasdale LLP

(57) ABSTRACT

An HVAC system includes an unloading device, a centrifugal compressor, a gas foil bearing, a VFD and a controller. The controller is programmed to start the centrifugal compressor from a stopped condition by operating the unloading device to remove a load from the centrifugal compressor, accelerating the motor to a first speed above a liftoff speed of the gas foil bearing and below an operating speed of the centrifugal compressor, running the motor for a period of time, operating the unloading device to apply the load to the centrifugal compressor, and accelerating the motor to the operating speed.

23 Claims, 13 Drawing Sheets

(56) References Cited

U.S. PATENT DOCUMENTS

| | | | |
|---|---|---|---|
| 2002/0102163 A1* | 8/2002 | Dudley | F04C 28/06 |
| | | | 417/281 |
| 2013/0335000 A1 | 12/2013 | Maier | |
| 2014/0272657 A1 | 9/2014 | Milacic et al. | |
| 2015/0362012 A1* | 12/2015 | Ermilov | F16C 43/02 |
| | | | 384/105 |

* cited by examiner

START-STOP CONTROL SYSTEMS AND METHODS FOR GAS FOIL BEARING MACHINE

FIELD

The field of the disclosure relates generally to control systems, and more particularly, to control systems for machines including gas foil bearing assemblies.

BACKGROUND

Gas foil bearing (GFB) machines are used in, among other things, HVAC applications such as two-stage refrigerant centrifugal compressors. HVAC compressors have a driveshaft operatively connected to a motor between impeller stages that is supported by gas foil bearings. The driveshaft can be positioned between impeller stages so the impellers are rotated at a rotation speed to compress the refrigerant to a selected pressure in an HVAC system. The compressor bearings are typically provided with one or more features to reduce friction between the compressor bearing and the driveshaft. Once the shaft is spinning fast enough, gas pushes the foil away from the shaft so that no contact occurs. The shaft and gas foil bearing are separated by the gas's high pressure, which is generated by the rotation that pulls gas into the bearing via viscosity effects. A high speed of the shaft with respect to the gas foil bearing is required to initiate the air gap, and once this has been achieved, no wear occurs. These bearings have several advantages over known bearings including reduced weight due to the elimination of an oil system, stable operation at higher speeds and temperatures, low power loss at high speeds, and long life with little maintenance.

Current gas foil bearings deform in response to the pressure developed within the compressor. Wear and tear occurs to the gas foil bearings during the start-up and stopping operations. More specifically, running GFB machines below liftoff speed and compressor surge events cause accelerated wear of the bearing and bearing coating. Surge is a characteristic behavior of a centrifugal compressor that can occur when inlet flow is reduced such that the head developed by the compressor is insufficient to overcome the pressure at the discharge of the compressor. Once surge occurs, the output pressure of the compressor is drastically reduced, resulting in flow reversal within the compressor. When a centrifugal compressor surges, there is an actual reversal of gas flow through the compressor impeller. The surge usually starts in one stage of a multistage compressor and can occur very rapidly. Compressors are especially susceptible to surge events during startups and shutdowns due to the lower operating speeds. The severity of surge events and the damage caused by them increase with compressor speed. Minimizing the time the GFB machine is run below its liftoff speed and minimizing the number and severity of surge events experienced by the compressor increases the life of the bearings.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, an HVAC system including an unloading device, a centrifugal compressor, a gas foil bearing, and a controller is described. The centrifugal compressor includes a compressor housing, a motor having a driveshaft rotatably supported within the compressor housing, and an impeller connected to the driveshaft and operable to compress refrigerant gas upon rotation of the driveshaft. The gas foil bearing is supported by the compressor housing and supports the driveshaft. The controller is connected to the motor and the unloading device. The controller is programmed to start the centrifugal compressor from a stopped condition by operating the unloading device to remove a load from the centrifugal compressor, accelerating the motor to a first speed above a liftoff speed of the gas foil bearing and below an operating speed of the centrifugal compressor, running the motor at the first speed for a period of time, operating the unloading device to apply the load to the centrifugal compressor, and accelerating the motor to the operating speed. The controller is further programmed to stop the centrifugal compressor from an operating condition by operating the unloading device to remove a load from the centrifugal compressor, decelerating the motor toward a minimum speed greater than zero, and removing power from the motor when the speed of the motor reaches the minimum speed and allowing the motor to coast to a stop.

In another aspect, a controller for controlling a centrifugal compressor with a gas foil bearing supporting a shaft of an impeller driven by a motor is described. The controller includes a motor interface for connection to the motor, an unloading interface for connection to an unloading device, a processor, and a memory. The memory contains instructions that, when executed by the processor, cause the controller to start the centrifugal compressor from a stopped condition by operating the unloading device to remove a load from the centrifugal compressor, accelerating the motor to a first speed above a liftoff speed of the gas foil bearing and below an operating speed of the centrifugal compressor, running the motor at the first speed for a period of time, operating the unloading device to apply the load to the centrifugal compressor, and accelerating the motor to the operating speed. The memory further contains instructions that, when executed by the processor, cause the controller to stop the centrifugal compressor from an operating condition by operating the unloading device to remove a load from the centrifugal compressor, decelerating the motor toward a minimum speed greater than zero, and removing power from the motor when the speed of the motor reaches the minimum speed and allowing the motor to coast to a stop.

In yet another aspect, a method of controlling a centrifugal compressor with a gas foil bearing supporting a shaft of an impeller driven by a motor is described. The method includes starting the centrifugal compressor from a stopped condition by operating an unloading device to remove a load from the centrifugal compressor, accelerating the motor to a first speed above a liftoff speed of the gas foil bearing and below an operating speed of the centrifugal compressor, running the motor at the first speed for a period of time, operating the unloading device to apply the load to the centrifugal compressor, and accelerating the motor to the operating speed. The method further includes stopping the centrifugal compressor from an operating condition by operating the unloading device to remove a load from the centrifugal compressor, decelerating the motor toward a minimum speed greater than zero, and removing power from the motor when the speed of the motor reaches the minimum speed and allowing the motor to coast to a stop.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The following figures illustrate various aspects of the disclosure.

Corresponding reference characters indicate corresponding parts throughout the drawings.

DETAILED DESCRIPTION

For conciseness, examples will be described with respect to an HVAC compressor. However, the methods and systems described herein may be applied to any suitable gas foil bearing (GFB) machine. In a start-stop control system of a GFB machine, a startup routine that disconnects a load to the compressor then quickly accelerates the compressor to an unloaded speed that is above the liftoff speed of the bearings (~10 k RPM), and remaining at that speed until any initial surges have stopped would prevent additional deformation of the bearings. Additionally, a stopping routine that disconnects the load and then slowly decelerates the compressor to an estimated surge speed plus a margin, and then allowing the compressor to coast to a stop, would further prevent deformation of the bearings.

Figure 1:
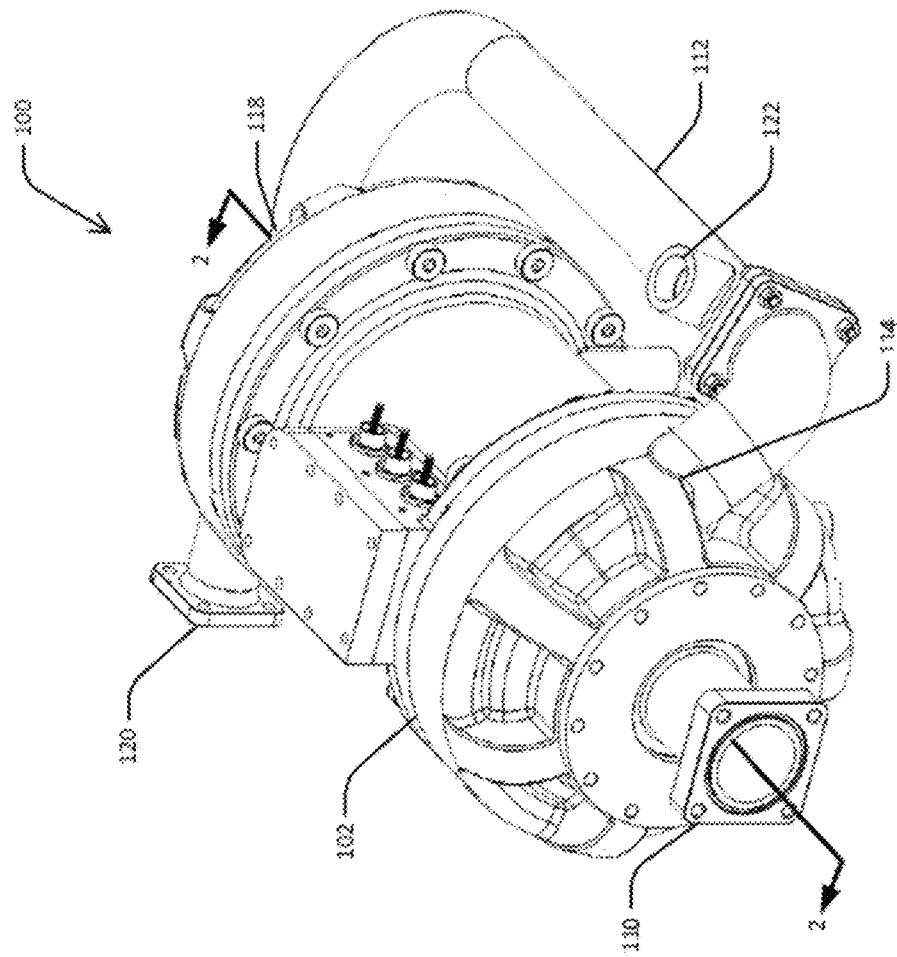
FIG. 1 is a perspective view of an assembled compressor.

Referring to FIG. 1, a compressor illustrated in the form of a two-stage refrigerant compressor is indicated generally at 100. The compressor 100 generally includes a compressor housing 102 forming at least one sealed cavity within which each stage of refrigerant compression is accomplished. The compressor 100 includes a first refrigerant inlet 110 to introduce refrigerant vapor into the first compression stage (not labeled in FIG. 1), a first refrigerant exit 114, a refrigerant transfer conduit 112 to transfer compressed refrigerant from the first compression stage to the second compression stage, a second refrigerant inlet 118 to introduce refrigerant vapor into the second compression stage (not labeled in FIG. 1), and a second refrigerant exit 120. The refrigerant transfer conduit 112 is operatively connected at opposite ends to the first refrigerant exit 114 and the second refrigerant inlet 118, respectively. The second refrigerant exit 120 delivers compressed refrigerant from the second compression stage to a cooling system in which compressor 100 is incorporated. The refrigerant transfer conduit 112 may further include a refrigerant bleed 122 to add refrigerant (economization) as needed at the compressor 100.

Figure 2:
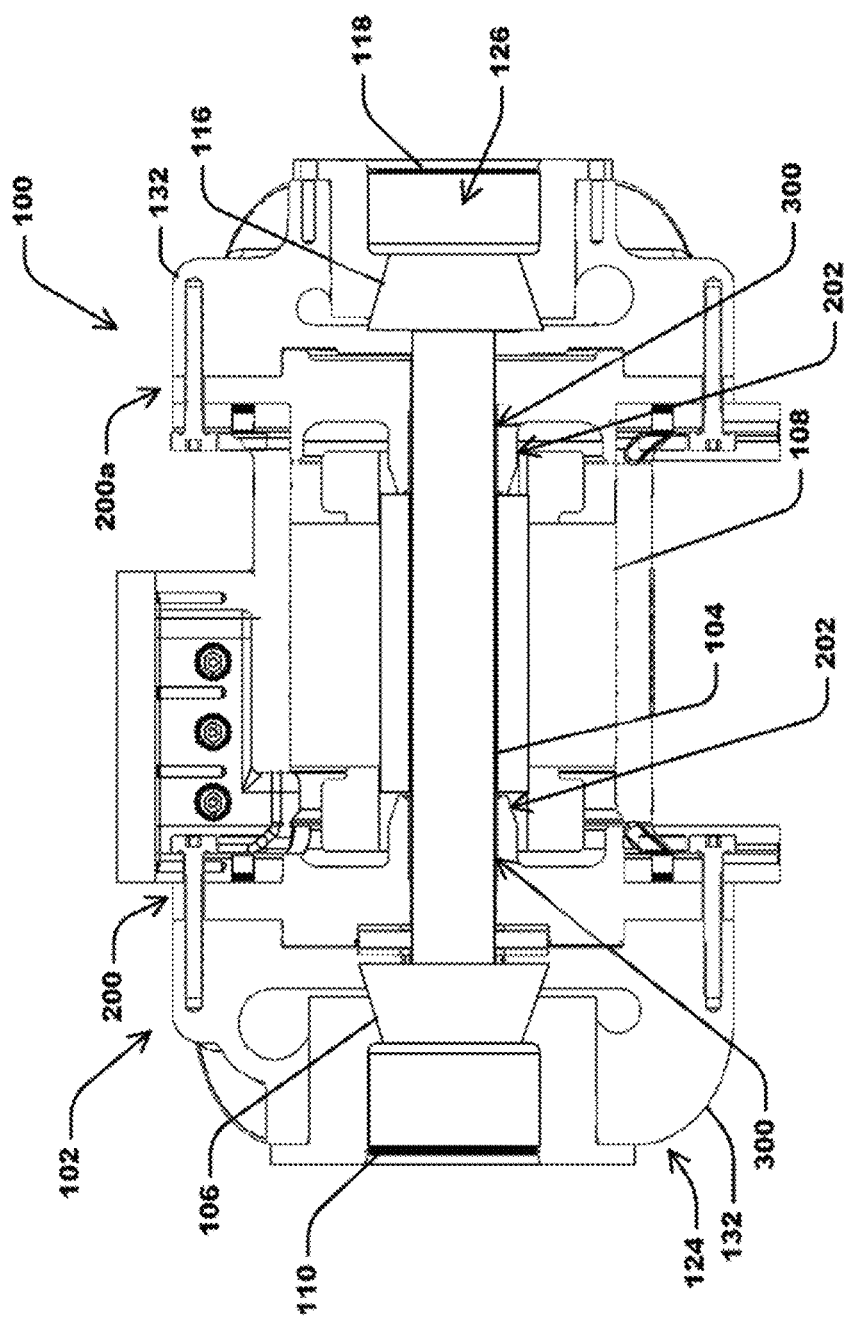
FIG. 2 is a cross-sectional view of the compressor of FIG. 1 taken along line 2-2, with the external conduit removed.

Referring to FIG. 2, the compressor housing 102 encloses a first compression stage 124 and a second compression stage 126 at opposite ends of the compressor 100. The first compression stage 124 includes a first impeller 106 configured to add kinetic energy to refrigerant entering via the first refrigerant inlet 110. The kinetic energy imparted to the refrigerant by the first impeller 106 is converted to increased refrigerant pressure (i.e. compression) as the refrigerant velocity is slowed upon transfer to a sealed cavity (e.g., a diffuser) formed between a bearing housing 200 and a portion of the outer compressor housing 102. Similarly, the second compression stage 126 includes a second impeller 116 configured to add kinetic energy to refrigerant transferred from the first compression stage 124 entering via the second refrigerant inlet 118. The kinetic energy imparted to the refrigerant by the second impeller 116 is converted to increased refrigerant pressure (i.e. compression) as the refrigerant velocity is slowed upon transfer to a sealed cavity (e.g., a diffuser) formed between a bearing housing 200a and a second portion of outer compressor housing 102. Compressed refrigerant exits the second compression stage 126 via the second refrigerant exit 120 (not shown in FIG. 2).

Referring to FIG. 2, the first stage impeller 106 and second stage impeller 116 are connected at opposite ends of a driveshaft 104. The driveshaft 104 is operatively connected to a motor 108 positioned between the first stage impeller 106 and second stage impeller 116 such that the first stage impeller 106 and second stage impeller 116 are rotated at a rotation speed selected to compress the refrigerant to a pre-selected pressure exiting the second refrigerant exit 120. Any suitable motor may be incorporated into the compressor 100 including, but not limited to, an electrical motor. The driveshaft 104 is supported by gas foil bearing assemblies 300 positioned within a sleeve 202 of each bearing housing 200/200a, as described in additional detail below. Each bearing housing 200/200a includes a mounting structure (not shown) for connecting the respective bearing housing 200/200a to the compressor housing 102, as illustrated in FIG. 2.

Figure 3:
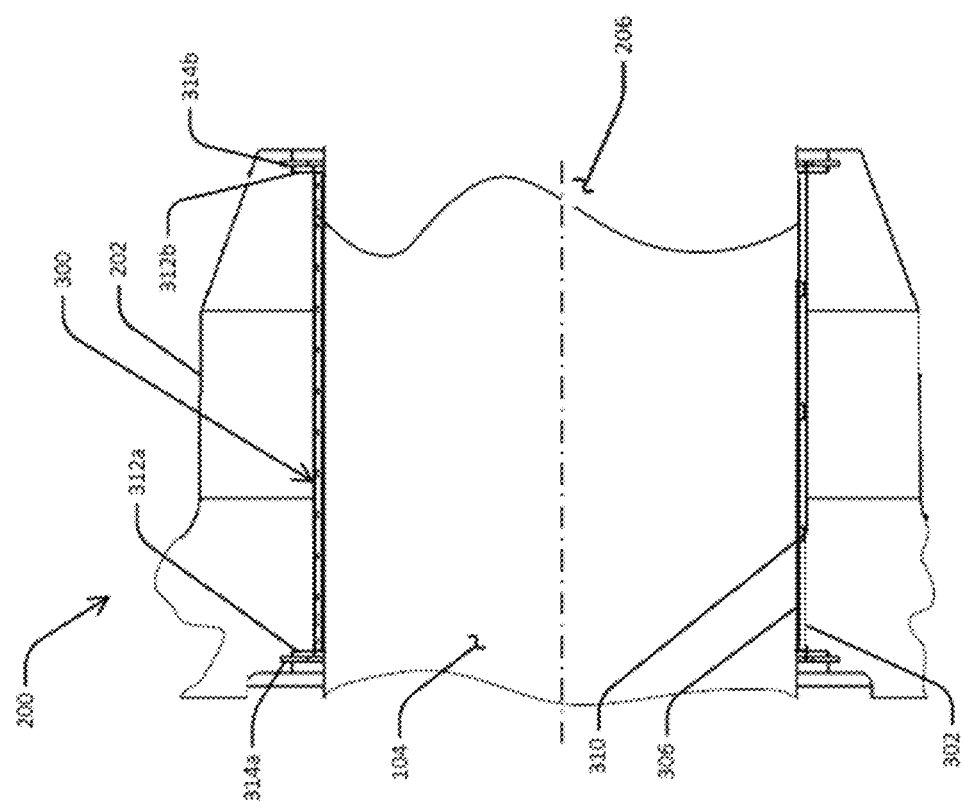
FIG. 3 is a cross-sectional view through a sleeve of the bearing housing shown in FIG. 2, illustrating the driveshaft supported within a foil bearing assembly maintained within the sleeve of the bearing housing using a pair of retaining clips.
Figure 5:
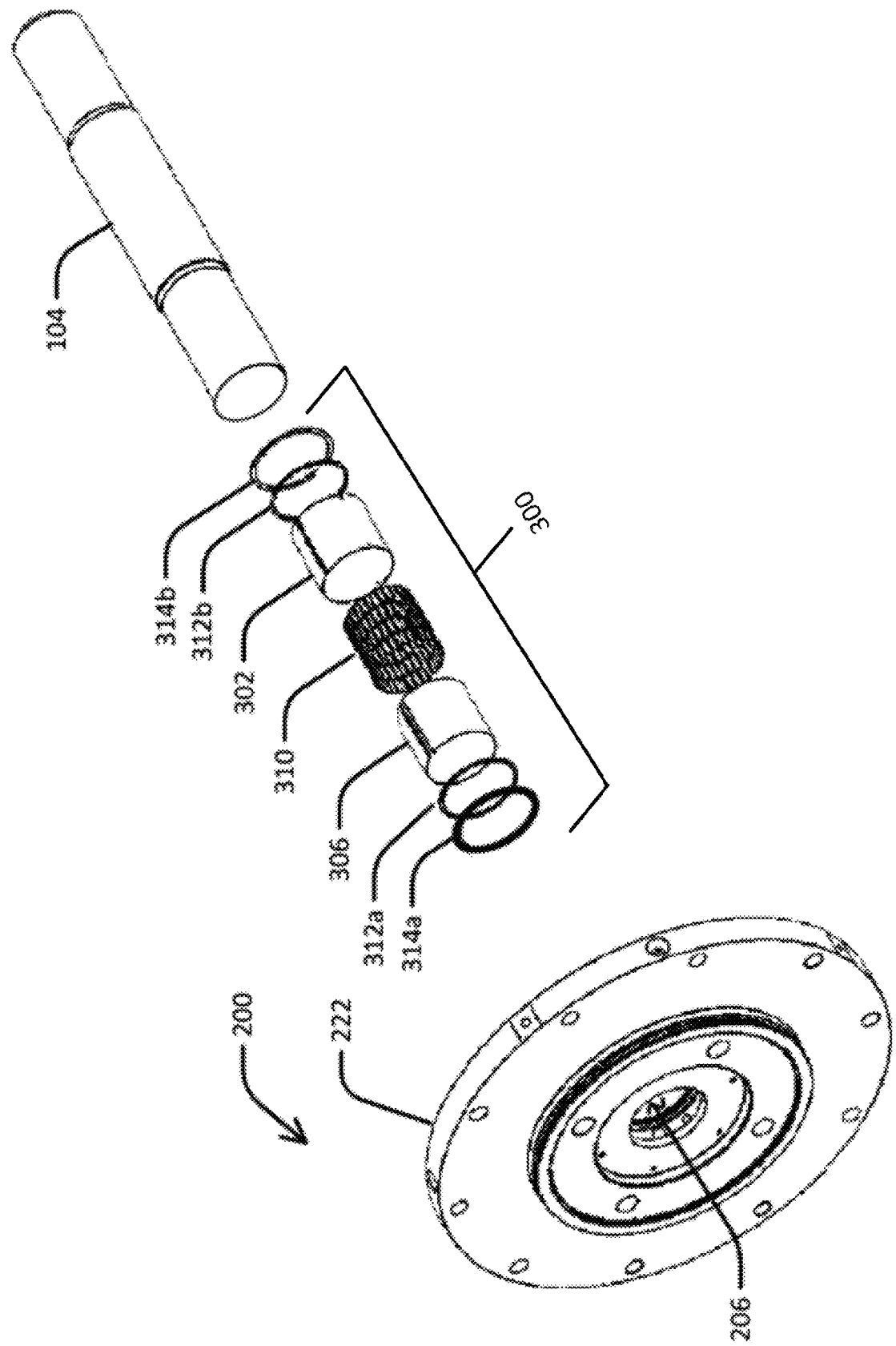
FIG. 5 is an exploded view of elements of the foil bearing assembly arranged with respect to the bearing housing and the driveshaft.

Referring to FIG. 2, each bearing housing 200/200a supports the driveshaft 104, and the driveshaft 104 projects through the bearing housing 200/200a opposite the sleeve 202, and the impeller 106 is connected to the projecting end of the driveshaft 104. Referring to FIG. 3 and FIG. 5, the gas foil bearing assembly 300 is positioned within a cylindrical bore 206 within the bearing housing 200. The driveshaft 104 closely fits within the gas foil bearing assembly 300, which includes an outer compliant foil or foil layer 302 positioned adjacent to the inner wall of the sleeve 202, an inner compliant foil or foil layer 306 (also referred to as a "top foil") positioned adjacent to the driveshaft 104, and a bump foil or foil layer 310 positioned between the inner foil layer 306 and the outer foil layer 302. The foils or layers 302/306/310 of the gas foil bearing assembly form an essentially cylindrical tube sized to receive the driveshaft 104 with relatively little or no gap design as determined by existing foil bearing design methods. The components of the foil bearing assembly 300, such as outer foil layer 302, the inner foil layer 306, and the bump foil layer 310, may be constructed of any suitable material that enables the foil bearing assembly 300 to function as described herein. Suitable materials include, for example and without limitation, metal alloys. In some embodiments, for example, each of the outer foil layer 302, the inner foil layer 306, and the bump foil layer 310 is constructed of stainless steel (e.g., 17-4 stainless steel).

Referring again to FIG. 3, the foil bearing assembly 300 in the illustrated embodiment further includes a pair of foil keepers 312a/312b positioned adjacent opposite ends of the layers 302/306/310 to inhibit sliding of the layers 302/306/310 in an axial direction within the cylindrical bore 206 of the sleeve 202. A pair of foil retaining clips 314a/314b positioned adjacent to the foil keepers 312a/312b, respectively, fix the layers 302/306/310 in a locked axial position within the cylindrical bore 206 not shown on FIG. 3. Foil retaining clips 314a/314b may be removably connected to bearing housing 200.

Figure 4:
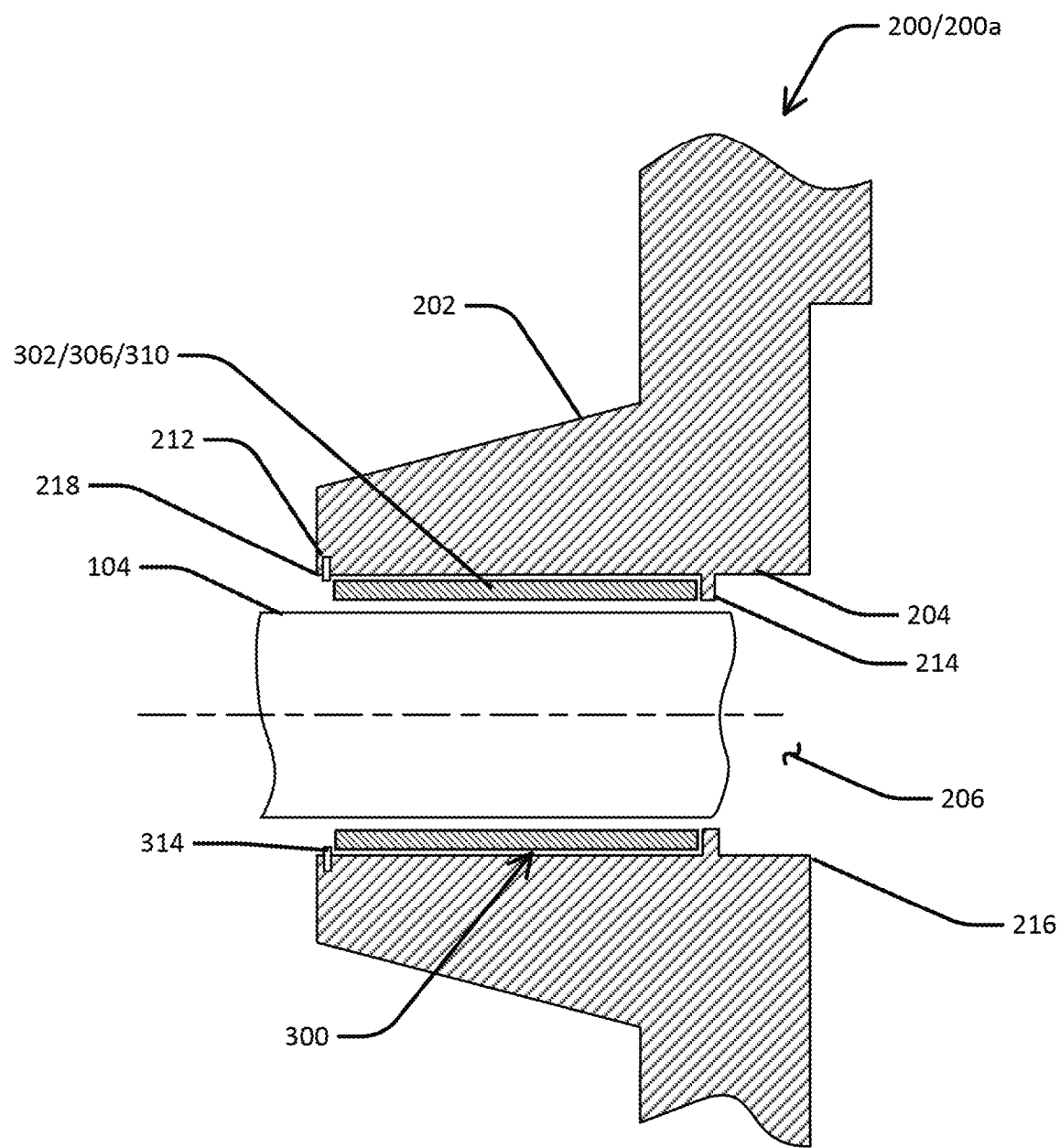
FIG. 4 is a cross-sectional view of another embodiment of a bearing housing suitable for use in the compressor of FIG. 1, illustrating the driveshaft supported within a foil bearing assembly maintained within the bearing housing between a retaining lip formed within the bearing housing at one end and a retaining clip at an opposite end.

In other embodiments, as illustrated in FIG. 4, each bearing housing 200 includes a foil retaining lip 214 formed integrally (e.g., cast) with the bearing housing 200 and projecting radially inward from the radial inner surface 204 that defines the cylindrical bore 206. In the illustrated embodiment, the foil retaining lip 214 is positioned near an impeller end 216 of the cylindrical bore 206 proximal to the impeller 116 (shown in FIG. 2). The foil retaining lip 214 is sized and dimensioned to project a radial distance from the radial inner surface 204 that overlaps at least a portion of the layers 302/306/310 of the foil bearing assembly 300. The foil retaining lip 214 may extend fully around the circumference of the radial inner surface 204, or the foil retaining lip can include two or more segments extending over a portion of the circumference of the radial inner surface 204 and separated by spaces flush with the adjacent radial inner surface 204. Bearing housing 200a (not shown in FIG. 4) is similarly formed.

The foil bearing assembly 300 of the embodiment illustrated in FIG. 4 further includes a single foil retaining clip 314 positioned adjacent the ends of the layers 302/306/310 opposite the foil retaining lip 214 to inhibit axial movement of the layers 302/306/310 within the cylindrical bore 206 of the sleeve 202. In this embodiment, the foil retaining clip 314 snaps into a circumferential groove 212 formed within the radial inner surface 204 of the cylindrical bore 206 near a motor end 218 of the cylindrical bore 206.

The foil retaining lip 214 may be positioned within any region of the cylindrical bore 206 near the impeller end 216 including, without limitation, a position immediately adjacent to the opening of the cylindrical bore 206 at the impeller end 216. Alternatively, the foil retaining lip 214 may be positioned within any region of the cylindrical bore 206 near the motor end 218 including, without limitation, a position immediately adjacent to the opening of the cylindrical bore 206 at the motor end 218. In such embodiments, the foil retaining clip 314 snaps into a circumferential groove 212 formed within the radial inner surface 204 of the cylindrical bore 206 near the impeller end 216, in an arrangement that is essentially the opposite of the arrangement illustrated in FIG. 4.

Referring again to FIG. 4, the foil bearing assembly 300 is installed within the bearing housing 200 by inserting the foil bearing assembly 300 into the cylindrical bore 206 of the bearing housing 200 at the motor end 218. The foil bearing assembly 300 is then advanced axially into the cylindrical bore 206 toward the impeller end 216 until the layers 302/306/310 contact the foil retaining lip 214. The foil retaining clip 314 is then snapped into the circumferential groove 212 near the motor end 218 of the cylindrical bore 206 to lock the foil bearing assembly 300 in place.

In other embodiments, any suitable method for affixing the foil bearing assembly 300 within the sleeve 202 may be used. Non-limiting examples of suitable methods include keepers and retaining clips, adhesives, set screws, and any other suitable affixing method.

The bearing housings 200/200a may further serve as a mounting structure for a variety of elements including, but not limited to, radial bearings, such as the foil bearing assembly 300 described above, a thrust bearing, and sensing devices (not shown) used as feedback for passive or active control schemes such as proximity probes, pressure transducers, thermocouples, key phasers, and the like.

The foil bearing assembly 300 may be provided in any suitable form without limitation. For example, the foil bearing assembly 300 may be provided with two layers, three layers, four layers, or additional layers without limitation. The bump foil 310 of the foil bearing assembly 300 may be formed from a radially elastic structure to provide a resilient surface for the spinning driveshaft 104 during operation of the compressor 100. The bump foil 310 may be formed from any suitable radially elastic structure without limitation including, but not limited to, an array of deformable bumps or other features designed to deform and rebound under intermittent compressive radial loads, and any other elastically resilient material capable of compressing and rebounding under intermittent compressive radial loads. The bump foil 310 may be connected to at least one adjacent layer including, but not limited to at least one of the outer layer 302 and the inner layer 306. In some embodiments, the bump foil 310 may be connected to both the outer layer 302 and the inner layer 306. In other embodiments, the bump foil 310 may be free-floating and not connected to any layer of the foil bearing assembly 300.

Figure 6:
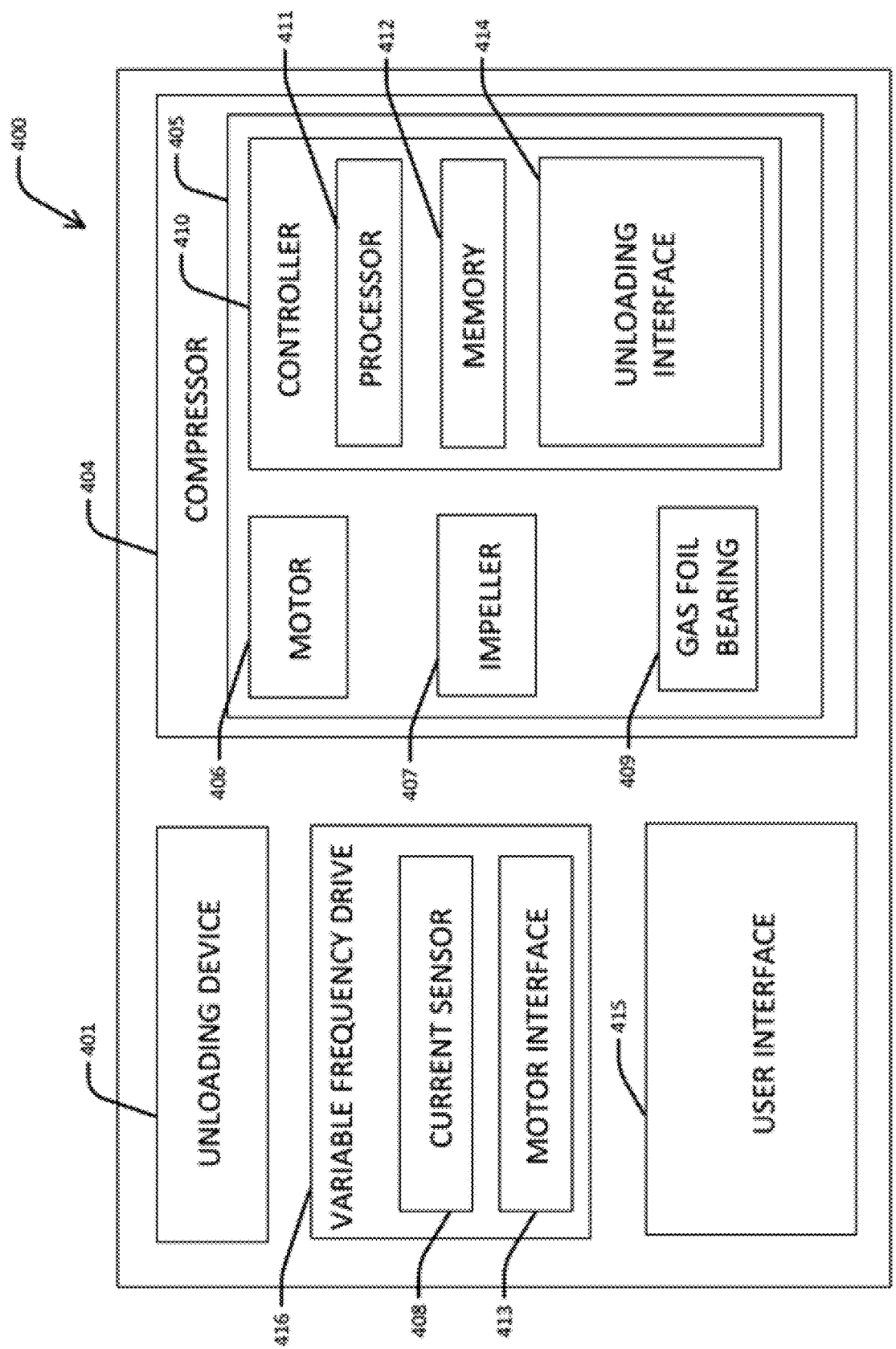
FIG. 6 is a block diagram of a start-stop control system for a gas foil bearing (GFB) machine.

Referring to FIG. 6, an example embodiment of a system 400 includes a centrifugal compressor 404. The system 400 includes the compressor 404 with a compressor housing 405, an unloading device 401, and a user interface 415, a controller 410. The compressor includes a motor 406, an impeller 407, and a gas foil bearing 409. The system 400 further includes a variable frequency drive (VFD) 416 with a current sensor 408 and a motor interface 413 in communication with the motor 406. The compressor housing 405 and the compressor 404 including the motor 406, the impeller 407, and the gas foil bearing 409 may be constructed similarly to the compressor 100 described in FIG. 1-5 or may be constructed in a different manner. The compressor 404 is not limited to a specific construction in the system 400. The compressor 404 includes a controller 410 for controlling the start, stop, and operating routines of the compressor 404. The controller 410 includes a processor 411, a memory 412, and an unloading interface 414. The memory 412 contains instructions that are executed by processor 411 to cause the controller 410 to perform the methods.

The unloading device 401 in the system 400 removes and/or reduces the load on the compressor during start-up and shutdown routines to handle surge events to prevent accelerated wear of the gas foil bearings 409. In a centrifugal compressor 404 too low of a flow or too high of a pressure rise changes the angle of attack within the impeller, creating separation and stall. This causes compressor flow instability and shocks the bearings and gears, if used, as well as system pressure instability. This is caused by the inlet density and flow dropping due to issues such as excess throttling, hot discharge gas, cold return gas, or a clogged condenser intake filter. When these process conditions force the compressor 404 to operate with low flow rates, and to ensure that the compressor 404 always handles more flow than a surge value, the unloading device 401 is opened when necessary to allow the gas delivered by the compressor 404 to recirculate to the suction. With the unloading device 401 coupled to the compressor 404, flow is maintained to prevent the compressor 404 to enter a stall/surge cycle. In the example, the unloading device 401 is a bypass valve or a blow-off valve, in the acceptable applications. Bypass valves, such as refrigerant bypass valves provide an alternative path for the gas, thereby stopping the pressure rise of the compressor 404, and thus limiting any potential surging, no matter how slow the compressor motor 406 is accelerating during start-up or decelerating during shutdown. In other embodiments, the unloading device 401 is an expansion valve. An expansion valve removes pressure from the liquid refrigerant to allow expansion or change of state from a liquid to a vapor in the evaporator of the compressor 404 and is included in many HVAC systems. Further embodiments of the unloading device 401 include a variable orifice or diameter valve, such as a servo valve, and a fixed orifice or diameter valve, such as a solenoid valve and a pulse-width-modulated (PWM) valve configured to control opening and closing according to a duty cycle. Other embodiments of the unloading device 401 may include, but not limited to, a variable diffuser, or a Variable Inlet Guide Vane (VIGV). Although many types of unloading devices are described here, the unloading device 401 may be any suitable device that reduces the load on the compressor 404. The strategic opening of the unloading device 401 at the start-up and stopping routines of the compressor 404 is dictated by the system 400.

The unloading device 401 is operatively coupled to the controller 410, and the controller 410 is configured to control at least one operating parameter of the unloading device 401, such as opening of a bypass valve according to one or more control schemes as described in detail below. The controller 410 controls removing or reducing the load on the compressor 404 according to one or more control schemes based on measurements or other data received from current sensor 408 and is configured to monitor one or more states of the compressor 404. The current sensor 408 senses a current of the motor 406 and the controller 410 determines whether surging of the compressor 404 has stopped if the sensed current of the motor 406 is a substantially constant current. Non-limiting examples of suitable sensors for use in the one or more control schemes include temperature sensors, pressure sensors, flow sensors, current sensors, voltage sensors, rotational rate sensors, and any other suitable sensors. In other embodiments, the controller 410 controls removing or reducing the load on the compressor 404 according to one or more control schemes without reliance on measurements or other data received from sensors, and instead operates based on preset timings.

In some embodiments, the removing or reducing the load is controlled in response to a detected state of the compressor 404. In these embodiments, the compressor system 100 includes at least one unloading device 401 controlled by the controller 410. In some embodiments, the reduction or disconnection of a load on the compressor 404 is controlled by operating the at least one unloading device 401 according to one or more feedback control schemes based on a detected state of the compressor 404. The feedback or closed loop control scheme used to enable the reduction or disconnection of a load to the compressor 404 may include, but is not limited to, PID controllers, PI controllers, fuzzy logic controllers, and any other suitable control schemes that may be used to reduce or disconnect a load on the compressor 404.

Control system 400 includes a motor interface 413 for connection of the VFD 416 to the motor 406, an interface for connection of the controller to the drive, and an unloading interface 414 for connection of the controller 410 to the unloading device 401 so the processor 411 may execute instructions stored in memory 412 to reduce or disconnect the load from the compressor 400 during start-up and stopping methods.

Control system 400 include a user interface 415 configured to output (e.g., display) and/or receive information (e.g., from a user) associated with the system 400. In some embodiments, the user interface 415 is configured to receive an activation and/or deactivation inputs from a user to activate and deactivate (i.e., turn on and off) or otherwise enable operation of the system 400. Moreover, in some embodiments, user interface 415 is configured to output information associated with one or more operational characteristics of the system 400, including, for example and without limitation, warning indicators, a status of the gas foil bearing 409, and any other suitable information.

The user interface 415 may include any suitable input devices and output devices that enable the user interface 415 to function as described herein. For example, the user interface 415 may include input devices including, but not limited to, a keyboard, mouse, touchscreen, joystick(s), throttle(s), buttons, switches, and/or other input devices. Moreover, the user interface 415 may include output devices including, for example and without limitation, a display (e.g., a liquid crystal display (LCD), or an organic light emitting diode (OLED) display), speakers, indicator lights, instruments, and/or other output devices. Further, the user interface 415 may be part of a different component, such as a system controller (not shown). Other embodiments do not include a user interface 415.

In some embodiments, the system 400 may be controlled by a remote control interface. For example, the system 400 may include a communication interface (not shown) configured for connection to a wireless control interface that enables remote control and activation of the system 400. The wireless control interface may be embodied on a portable computing device, such as a tablet or smartphone.

The controller 410 is generally configured to control operation of the compressor 404. The controller 410 controls operation through programming and instructions from another device or controller, or is integrated with the control system 400 through a system controller. In some embodiments, for example, the controller 410 receives user input from the user interface 415, and controls one or more components of the system 400 in response to such user inputs. For example, the controller 410 may control power supply to the motor 406 based on user input received from the user interface 415. Moreover, in some embodiments, the controller 410 may regulate or control electrical power supplied to the system 400, such as from an energy storage device.

The controller 410 may generally include any suitable computer and/or other processing unit, including any suitable combination of computers, processing units and/or the like that may be communicatively coupled to one another and that may be operated independently or in connection within one another (e.g., controller 410 may form all or part of a controller network). Controller 410 may include one or more modules or devices, one or more of which is enclosed within system 400, or may be located remote from system 400. The controller 410 may be part of compressor 404 or separate and may be part of a system controller in an HVAC system. Controller 410 and/or components of controller 410 may be integrated or incorporated within other components of system 400. In some embodiments, for example, controller 410 may be incorporated within motor 406 or unloading device 401. The controller 410 may include one or more processor(s) 411 and associated memory device(s) 412 configured to perform a variety of computer-implemented functions (e.g., performing the calculations, determinations, and functions disclosed herein). As used herein, the term "processor" refers not only to integrated circuits, but also refers to a controller, a microcontroller, a microcomputer, a programmable logic controller (PLC), an application specific integrated circuit, and other programmable circuits. Additionally, memory device(s) 412 of controller 410 may generally be or include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 412 may generally be configured to store suitable computer-readable instructions that, when implemented by the processor(s), configure or cause controller 410 to perform various functions described herein including, but not limited to, controlling the system 400, controlling operation of the motor 406, receiving inputs from user interface 415, providing output to an operator via user interface 415, controlling the unloading device 401 and/or various other suitable computer-implemented functions.

Figure 7:
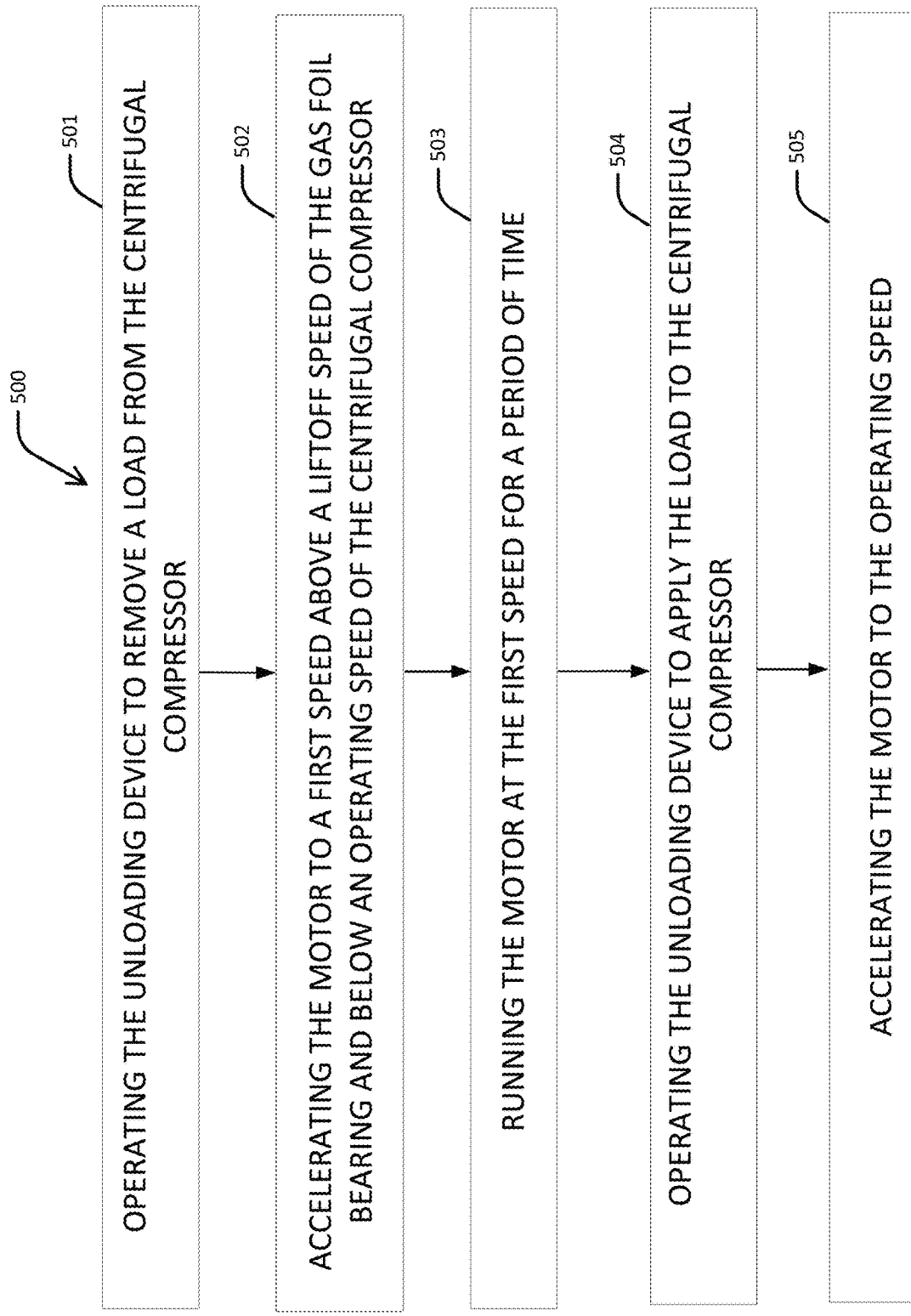
FIG. 7 is a flowchart of a method of starting a centrifugal compressor from a stopped condition.

Referring to FIG. 7, a method 500 of starting a centrifugal compressor from a stopped condition is described. The method 500 may also be referred to as a start-up routine or start-up method. This start-up method 500, as well as additional methods described herein may be implemented using the system 400 described above. The processor 411 executes instructions for the method 500 and the memory 412 stores the instructions. The start-up method 500 begins by operating 501 the unloading device 401 to remove a load from the centrifugal compressor 404. In the example embodiment, the unloading device is a bypass valve between the discharge and suction of the compressor 404 to lower the compressor's 404 pressure ratio and increasing its mass flow rate by opening the valve. Next, the motor 406 is accelerated 502 to a first speed above a liftoff speed of the gas foil bearing 409 and below an operating speed of the centrifugal compressor 404. By quickly accelerating to the first speed while the compressor 404 is unloaded, the compressor 404 is run below liftoff speed of the gas foil bearings 409 for the reduced amount of time to help prevent wear on the gas foil bearings 409 and to handle potential surge events during start-up. The motor 406 is then run 503 at the first speed for a period of time. In the example embodiment, the period of time the motor 406 is run is set and predetermined by either the manufacturer or by the user via the user interface 415. In other embodiments, the period of time is a variable period of time that begins when the motor reaches the first speed and ends when surging of the centrifugal compressor stops and can be estimated, calculated, or measured. Regardless of whether the compressor 404 experiences a surge event, the system 400 accelerates the compressor 404 to the first speed above liftoff speed of the gas foil bearing 409 to minimize wear on them. In some cases, when the motor 406 is run at the first speed for a period of time there may not be surge events in the start-up routine. If a surge event has occurred during the start-up method 500, the current sensor 408 will sense the current of the motor 406 and the controller 410 determines that surging of the compressor 404 has stopped when the sensed current of the motor 406 is a substantially constant current. In some embodiments, the system 400 may incorporate different learning algorithms to monitor and store measurements of the system during multiple start-ups and to optimize the period of time the motor is run at the first speed based on historical trends stored in memory 412 of the duration and significance of surging events. In some embodiments, the system 400 monitors and stores measurements associated with all surging events experienced over a lifetime of the compressor 404 and sets the period of time as the longest surging event that is currently stored in memory 412. In this case, each time a new surging event occurs that is longer than the period of time currently set by the system 400, the period of time is reset to be longer than the most recent surging event for future iterations of the start-up method 500. In some embodiments, machine learning algorithms or neural networks may be utilized by the system 400 to predict the frequency and duration of surge events for a compressor 404 based on different simulated environments the compressor 404 will reside in and set the period of time based on these simulations.

Figure 8:
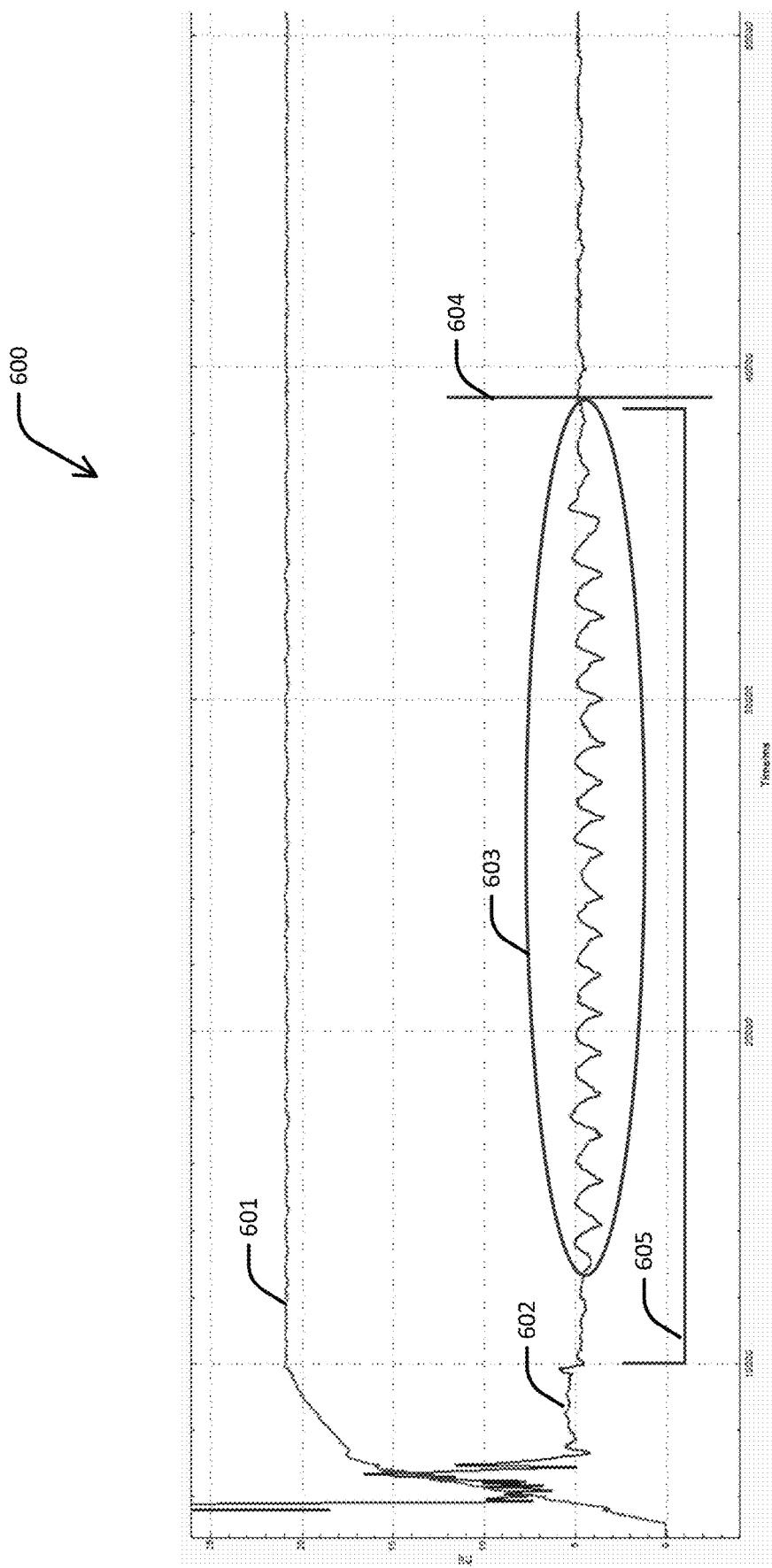
FIG. 8 is a surge current characterization graph for a centrifugal compressor.

Referring to FIG. 8, a surge current characterization graph 600 during start-up method 500 is shown including a speed curve 601 and a motor current curve 602. FIG. 8 shows, accelerating 502 the motor speed to the first speed, and running 503 the motor 406 at that first speed for the period of time 605. During running 503 the motor 406 at the first speed for the period of time 605, a region of possible surge 603 has been identified with oscillations in the motor current curve 602. The compressor 404 is held at the unloaded speed until the current oscillating pattern of surge has ceased 604 and the compressor 404 is indicated for full start-up.

Referring back to the start-up method 500 of FIG. 7, after the motor 406 is run 503 at the first speed for a period of time 605, the unloading device 401 is operated 504 to apply the load to the compressor 404. In some embodiments, applying the load to the compressor 404 includes closing a bypass valve. In FIG. 8, and in all cases of surging, operating 504 the unloading device to apply the load to the compressor 404 would only begin after current oscillating pattern of surge has ceased 604. If there is no surging during start-up, then the motor 406 runs at the first speed for a period of time 605 that is typically pre-determined by either the manufacturer or a user via user interface 415. Lastly, the motor 406 is then accelerated 505 to the operating speed and the compressor 404 completes the start-up routine and begins its operating routine. In some embodiments, the controller 410 accelerates the motor 406 to the first speed at a first acceleration and accelerates the motor to the operating speed at a second acceleration that is less than the first acceleration. In other embodiments, the first and second accelerations are the same. In other embodiments, the second acceleration is lesser than the first acceleration.

Figure 9:
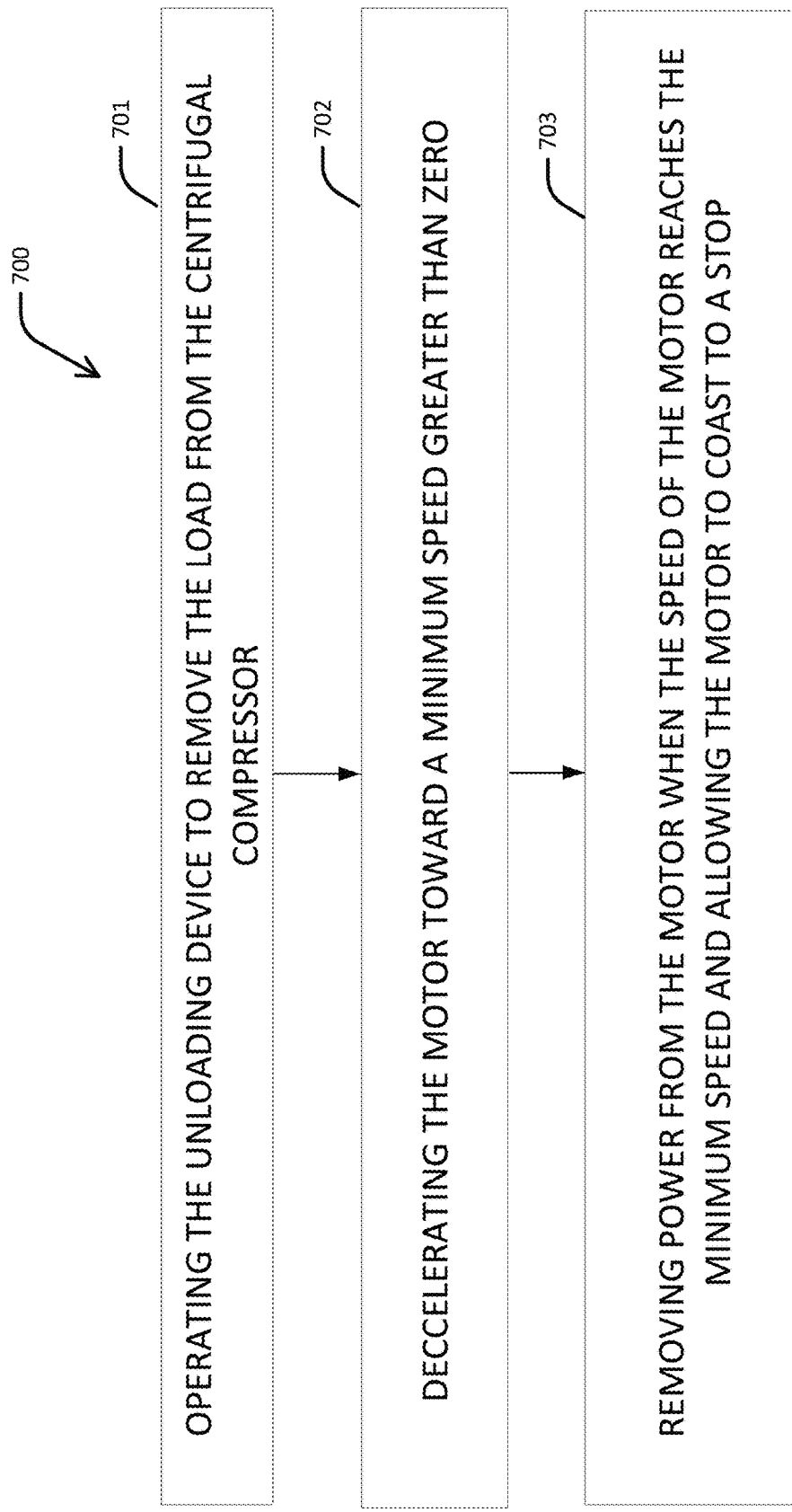
FIG. 9 is a flowchart of a method of stopping a centrifugal compressor from an operating condition.

Referring to FIG. 9, a method 700 of stopping a centrifugal compressor 404 from an operating condition is described. The method 700 may also be referred to as a stopping routine or stopping method. First, the unloading device 401 is operated 701 to remove the load from the compressor 404, similarly to start-up method 500. It should be noted that the controller 410 may implement either start-up method 500, operating, and stopping method 700, or any combination of these three stages of a compressor 404. Next, the motor 406 decelerates 702 toward a minimum speed greater than zero. Lastly, power is removed 703 from the motor 406 when the speed of the motor 406 reaches the minimum speed, and the motor 406 is then allowed to coast to a stop. In some embodiments, the minimum speed is an estimated surge speed below which surging of the compressor 404 may occur plus a margin.

Figure 10:
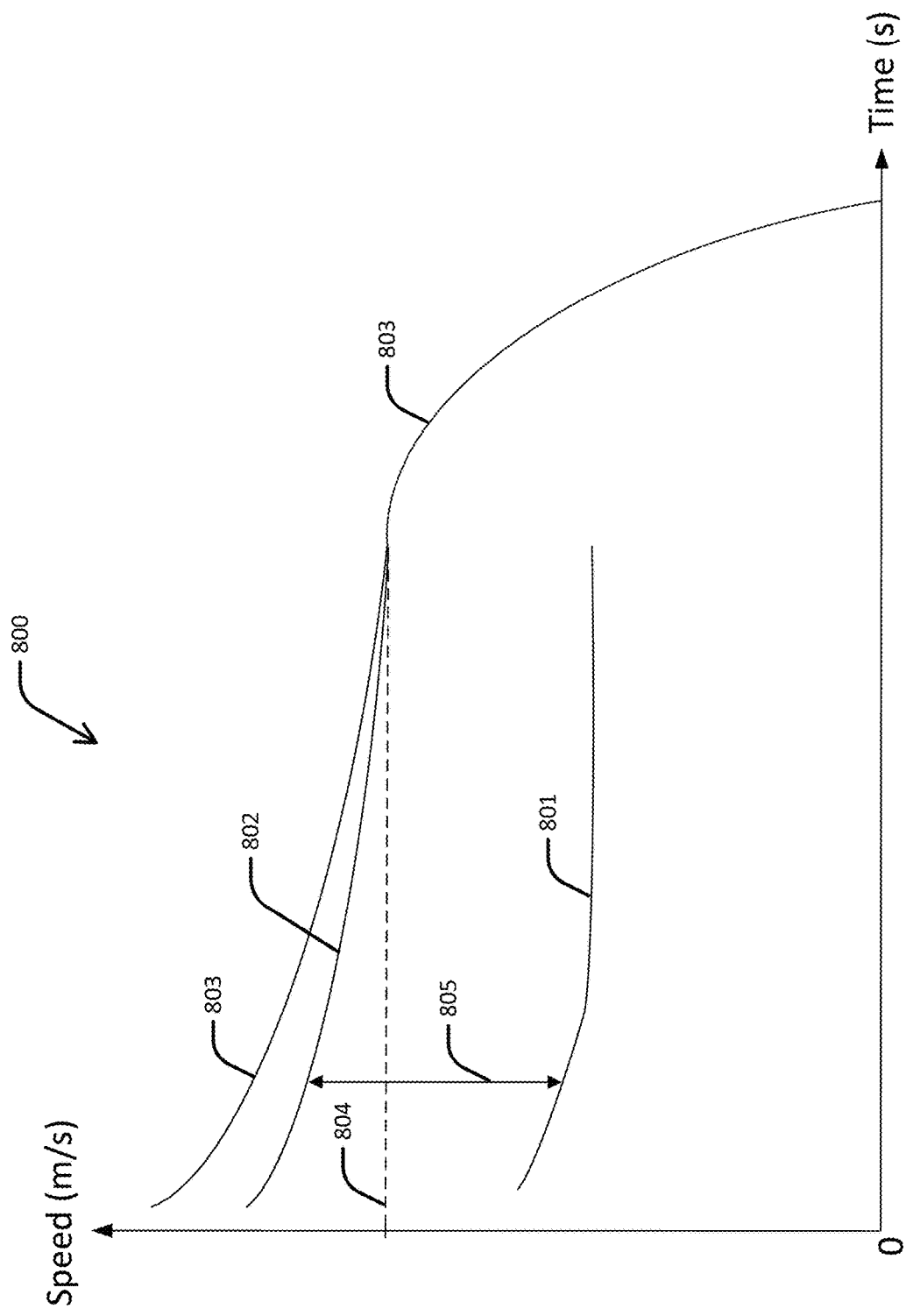
FIG. 10 is a graph of deceleration curves for estimated surge speed and minimum speed changes as actual speed decreases during stopping of a centrifugal compressor.

Referring to FIG. 10, deceleration curves 800 for estimated surge speed 801 and minimum speed 802 changes as actual speed 803 decreases during stopping of the compressor 404 are shown. The actual speed deceleration curve 803 shows the stopping method 700 when the motor 406 decelerates toward the minimum speed 802 greater than zero. At the point in which actual speed is at minimum speed 804, the power is removed and the motor 406 s allowed to coast to a stop. The estimated surge speed curve 801 is the estimated compressor speed below which there is a risk of a surge event occurring. To facilitate avoiding a surge event, a margin 805 is added to the estimated surge speed curve 801 for extra protection of the compressor 404 to not to fall beneath the estimated surge speed curve 801 during deceleration 702. The estimated surge speed plus margin curve 802 is the level that the controller 410 will prevent compressor 404 speed from falling beneath during the deceleration 702 toward the minimum speed. In some embodiments, the estimated surge speed is retrieved by the controller 410 from a lookup table and varies with a pressure ratio of an HVAC system the compressor 404 resides in. In other embodiments, the minimum speed is retrieved by the controller 410 from a lookup table and varies with a pressure ratio of an HVAC system the compressor 404 resides in. As described above with regards to surge events in the start-up method 500, learning algorithms may be used for calculating acceleration curves including the estimated surge speed plus margin curve 802, the estimated surge speed curve 801, and the minimum speed in the stopping method 700.

Figure 11:
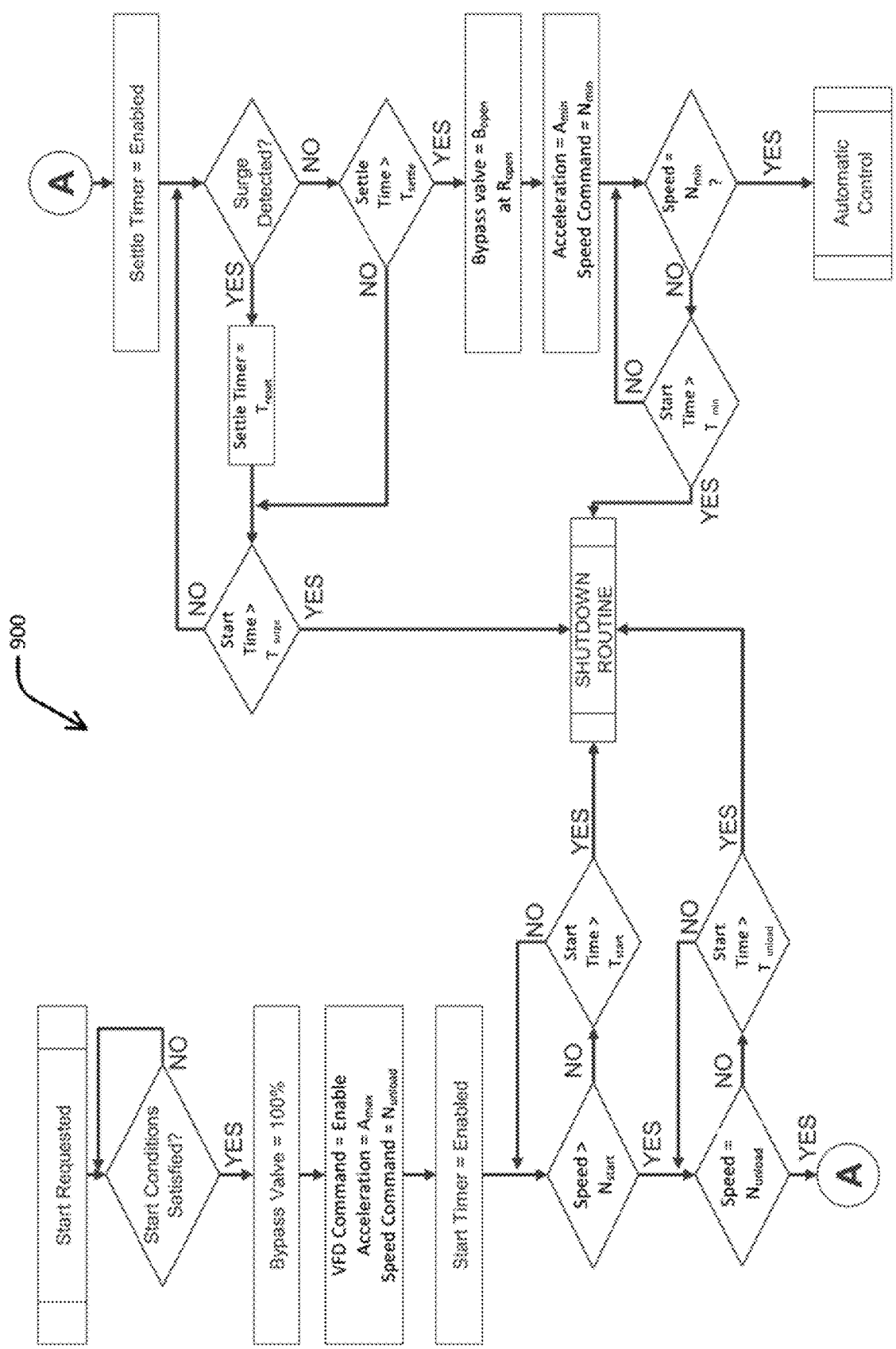
FIG. 11 is a flowchart of an example start routine for a centrifugal compressor.

Referring to FIG. 11, an example embodiment of the start-up method 900 is described. The start-up method 900 is one embodiment of the broader start-up method 500 and is meant to be non-limiting and may be implemented using the system 400 described above. In this embodiment, the motor 406 and the gas foil bearing 409 are given start conditions of their temperatures being less than 100° F. Other start conditions may include waiting at least 5 minutes since the compressor 404 has been stopped, the compressor 404 having a requested demand (kW) greater than the minimum power, and the VFD 416 not being faulted. The start routine begins with requesting a start and checking if the start conditions described above have been satisfied and does not proceed until the conditions are satisfied. After the conditions are satisfied, the bypass valve is set to 100% and opened to unload the compressor 404. The VFD 416 is enabled and the acceleration of the motor 406 is set to $A_{max}$ RPM/sec, the speed command is set to $N_{unload}$ RPM, and a start timer is then enabled. In an example embodiment $A_{max}$ is 4500 RPM/sec and $N_{unload}$ is 10000 RPM. The speed increases and has $T_{start}$ seconds to reach $N_{start}$ RPM and the method 900 will not proceed further until this criterion is met. If $N_{start}$ RPM is reached after longer than $T_{start}$ seconds then an example embodiment of a shutdown method 1000 (shown in FIG. 12) is implemented as described below. In an example embodiment $T_{start}$ is 0.5 seconds and $N_{start}$ is 2000 RPM. Once $N_{start}$ RPM is reached within $T_{start}$ seconds, the speed is then increased to $N_{unload}$ RPM. The speed must reach $N_{unload}$ RPM within $T_{unload}$ seconds and will not proceed until this criterion is met. If $N_{unload}$ RPM is reached after longer than $T_{unload}$ seconds then the shutdown method 1000 is executed. In an embodiment $T_{unload}$ is 5 seconds. After $N_{unload}$ RPM is achieved the settle timer is enabled for surge events. The method 900 checks if a surge is detected and if so the settle time is set to $T_{reset}$. In an example embodiment $T_{reset}$ is 0 seconds. In this case, if the start timer indicates that more than $T_{surge}$ minutes has elapsed, the shutdown method 1000 is executed. If the start timer indicates that less than $T_{surge}$ minutes have elapsed, than the method repeats, checking for surges until no surges are detected. When no surges are detected, the settle timer is checked. If the settle timer indicates less than $T_{settle}$ seconds has elapsed then the start timer is checked again to check if $T_{surge}$ minutes has elapsed. Again, if greater than $T_{surge}$ minutes has elapsed on the start timer, the shutdown method 1000 is executed and if less than $T_{surge}$ minutes has elapsed on the start timer, the method repeats the surge detection step. In an example embodiment $T_{surge}$ is 2 minutes and $T_{settle}$ is 30 seconds. If the settle timer indicates greater than $T_{settle}$ seconds has elapsed then the bypass valve is set to $B_{open}$% at $R_{open}$% per second, the acceleration steps down to $A_{min}$ RPM/sec, and the speed command is set to $N_{min}$, a minimum speed. The actual speed is then compared to $N_{min}$. If the start timer indicates greater than $T_{min}$ minutes and the actual speed has not reached $N_{min}$, then the shutdown method 1000 is executed. If the actual speed reaches the minimum speed within less than $T_{min}$ minutes as indicated by the start timer, then automatic control is activated for the compressor 404. In an example embodiment $B_{open}$ is 50%, $R_{open}$ is 0.5% per second, $A_{min}$ is 150 RPM/sec, and $T_{min}$ is in the range of 3-4 minutes. In other embodiments $A_{max}$, $N_{unload}$, $T_{start}$, $N_{start}$, $N_{unload}$, $T_{unload}$, $T_{reset}$, $T_{surge}$, $T_{settle}$, $B_{open}$, $R_{open}$, $A_{min}$, $N_{min}$, and $T_{min}$ may be any other suitable values. Automatic control indicated here is a separate set of control algorithms to operate the compressor until shutdown.

Figure 12:
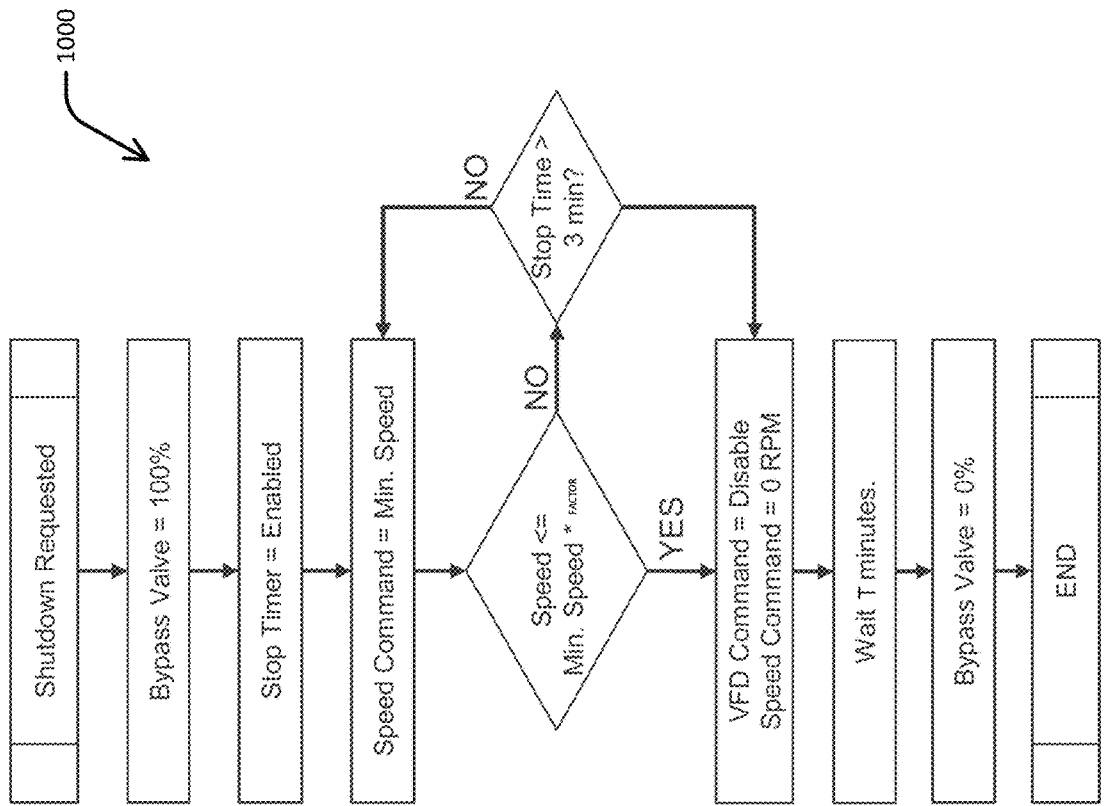
FIG. 12 is a flowchart of an example shutdown routine for a centrifugal compressor.

Referring to FIG. 12, an example embodiment of a shutdown method 1000 is described. The shutdown method 1000 is one embodiment of the broader stop method 700 and may be implemented using the system 400 described above. In this embodiment, when a shutdown is requested such as in the start-up method 900 described above, the bypass valve is set to 100% to unload the compressor. The stop timer is enabled and the speed command is set to a minimum speed, $N_{min}$. If the actual speed is greater than $N_{min}$ multiplied by 1.01, the stop timer is checked to see whether $T_{stop}$ minutes has elapsed. In this case, if the stop timer indicates that less than $T_{stop}$ minutes has elapsed, the speed command is set to $N_{min}$ again and actual speed is checked if it is greater than $N_{min}$ multiplied by Factor. If the stop time is greater than or equal to $T_{stop}$ minutes, then the VFD command is set to disabled and the speed command is set to 0 RPM. If the actual speed is less than the minimum speed multiplied by Factor then the VFD is also disabled and the speed command is set to 0 RPM. In an example embodiment $T_{stop}$ is 3 minutes and Factor is 1.01. Next is waiting $T_{wait}$ minutes and then the bypass valve is set to 0%. In an example embodiment $T_{wait}$ is 2 minutes. The shutdown method 1000 then concludes as the motor 406 coasts to a stop.

Figure 13:
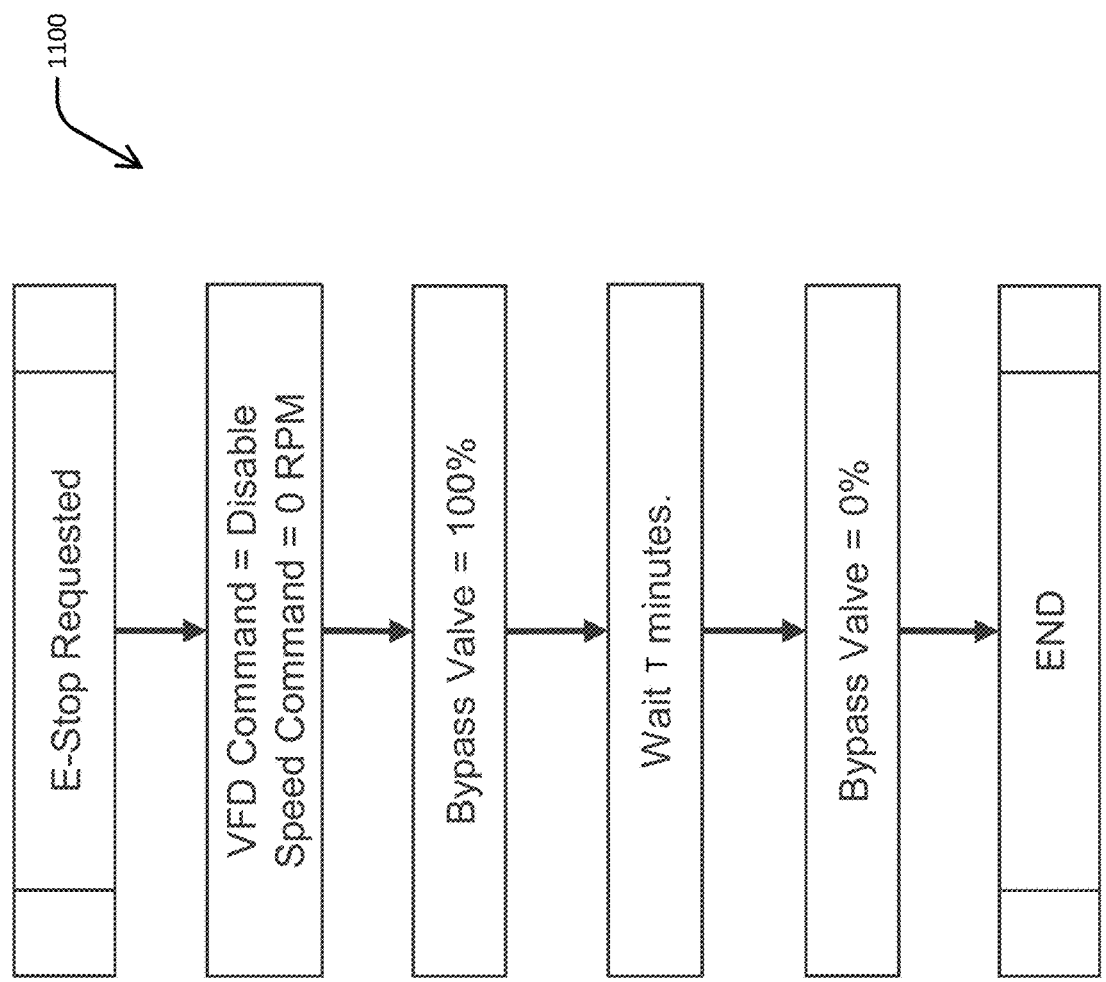
FIG. 13 is a flowchart of an example emergency-stop routine for a centrifugal compressor.

Referring to FIG. 13, in addition to a normal shutdown method 1000, an emergency stop (e-stop) method 1100 may also be implemented for user override of an HVAC system via user interface 415 or in the case of emergency shutdown. When an e-stop is requested the VFD command is set to disable and the speed command is set to 0 RPM. The bypass valve is set to 100% and after $T_{wait}$ minutes the bypass valve is then set to 0%. In an example embodiment $T_{wait}$ is 2 minutes. The e-stop method 1100 then concludes and the motor 406 coasts to a stop.

Technical benefits of the methods and systems described herein are as follows: (a) minimizing time that a compressor is below the liftoff speed of gas foil bearings to prevent wear of the bearings during start-up and stopping procedures in a HVAC system, (b) utilizing an unloading device to minimize the number and severity of surge events seen by a compressor in a HVAC system, and (c) keeping a compressor at an unloaded speed for a period of time to handle surge events during start-up and procedures, (d) reducing speed during shutdown to limit number and severity of surge events.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. An HVAC system comprising:
   an unloading device; and
   a centrifugal compressor comprising:
      a compressor housing;
      a motor having a driveshaft rotatably supported within the compressor housing;
      an impeller connected to the driveshaft and operable to compress refrigerant gas upon rotation of the driveshaft;
      a gas foil bearing supported by the compressor housing and supporting the driveshaft; and
      a controller connected to the motor and the unloading device, the controller programmed to:
         start the centrifugal compressor from a stopped condition by:
            operating the unloading device to remove a load from the centrifugal compressor,
            accelerating the motor to a first speed above a liftoff speed of the gas foil bearing and below an operating speed of the centrifugal compressor,
            running the motor at the first speed for a period of time,
            operating the unloading device to apply the load to the centrifugal compressor, and
            accelerating the motor to the operating speed.

2. The HVAC system of claim 1, wherein the controller is further programmed to stop the centrifugal compressor from an operating condition by:
   operating the unloading device to remove a load from the centrifugal compressor,
   decelerating the motor toward a minimum speed greater than zero, and
   removing power from the motor when the speed of the motor reaches the minimum speed and allowing the motor to coast to a stop.

3. The HVAC system of claim 1, wherein the period of time is a predetermined period of time.

4. The HVAC system of claim 1, wherein the period of time is a variable period of time that begins when the motor reaches the first speed and ends when surging of the centrifugal compressor stops.

5. The HVAC system of claim 4, further comprising a current sensor to sense a current of the motor, wherein the controller determines that surging of the centrifugal compressor has stopped when the sensed current of the motor is a substantially constant current.

6. The HVAC system of claim 1, wherein the controller accelerates the motor to the first speed at a first acceleration and accelerates the motor to the operating speed at a second acceleration that is less than the first acceleration.

7. The HVAC system of claim 1, wherein the minimum speed comprises an estimated surge speed below which surging of the centrifugal compressor may occur plus a margin.

8. The HVAC system of claim 7, wherein the estimated surge speed is retrieved by the controller from a lookup table and varies with a pressure ratio of the HVAC system.

9. The HVAC system of claim 7, wherein the minimum speed is retrieved by the controller from a lookup table and varies with a pressure ratio of the HVAC system.

10. The HVAC system of claim 1, wherein the unloading device comprises a refrigerant bypass valve.

11. A controller for controlling a centrifugal compressor with a gas foil bearing supporting a shaft of an impeller driven by a motor, the controller comprising:
    a VFD including a motor interface for connection to the motor;
    an unloading interface for connection to an unloading device;
    a processor; and
    a memory containing instructions that, when executed by the processor, cause the controller to:
       start the centrifugal compressor from a stopped condition by:
          operating the unloading device to remove a load from the centrifugal compressor,
          accelerating the motor to a first speed above a liftoff speed of the gas foil bearing and below an operating speed of the centrifugal compressor,
          running the motor at the first speed for a period of time,
          operating the unloading device to apply the load to the centrifugal compressor, and
          accelerating the motor to the operating speed.

12. The controller of claim 11, wherein the memory containing instructions that, when executed by the processor, further cause the controller to stop the centrifugal compressor from an operating condition by:
    operating the unloading device to remove a load from the centrifugal compressor, decelerating the motor toward a minimum speed greater than zero, and removing power from the motor when the speed of the motor reaches the minimum speed and allowing the motor to coast to a stop.

13. The controller of claim 10, wherein the period of time is a variable period of time that begins when the motor reaches the first speed and ends when surging of the centrifugal compressor stops.

14. The controller of claim 13, further comprising a current sensor interface to receive a signal representing a current of the motor from a current sensor, wherein the controller determines that surging of the centrifugal compressor has stopped when the sensed current of the motor is a substantially constant current.

15. The controller of claim 1, wherein the controller accelerates the motor to the first speed at a first acceleration and accelerates the motor to the operating speed at a second acceleration that is less than the first acceleration.

16. The controller of claim 1, wherein the minimum speed comprises an estimated surge speed below which surging of the centrifugal compressor may occur plus a margin.

17. The controller of claim 16, wherein the estimated surge speed or the minimum speed is retrieved by the controller from a lookup table and varies with a pressure ratio of the HVAC system.

18. A method of controlling a centrifugal compressor with a gas foil bearing supporting a shaft of an impeller driven by a motor, the method comprising:

starting the centrifugal compressor from a stopped condition by:

operating an unloading device to remove a load from the centrifugal compressor, accelerating the motor to a first speed above a liftoff speed of the gas foil bearing and below an operating speed of the centrifugal compressor, running the motor at the first speed for a period of time, operating the unloading device to apply the load to the centrifugal compressor, and accelerating the motor to the operating speed.

19. The method of claim 18, further comprising stopping the centrifugal compressor from an operating condition by:

operating the unloading device to remove a load from the centrifugal compressor, decelerating the motor toward a minimum speed greater than zero, and removing power from the motor when the speed of the motor reaches the minimum speed and allowing the motor to coast to a stop.

20. The method of claim 18, wherein the period of time is a variable period of time that begins when the motor reaches the first speed and ends when surging of the centrifugal compressor stops.

21. The method of claim 20, further comprising:

receiving a signal representing a current of the motor from a current sensor; and determining that surging of the centrifugal compressor has stopped when the sensed current of the motor is a substantially constant current.

22. The method of claim 18, wherein accelerating the motor to a first speed comprises accelerating the motor to the first speed at a first acceleration, and accelerating the motor to the operating speed comprises accelerating the motor to the operating speed at a second acceleration that is less than the first acceleration.

23. The method of claim 18, wherein the minimum speed comprises an estimated surge speed below which surging of the centrifugal compressor may occur plus a margin, and the method further comprises retrieving the estimated surge speed or the minimum speed from a lookup table.

* * * * *